B. C. WHITE.
SEED COTTON CLEANER.
APPLICATION FILED AUG. 28, 1911.
1,030,249.
Patented June 18, 1912.
2 SHEETS—SHEET 1.
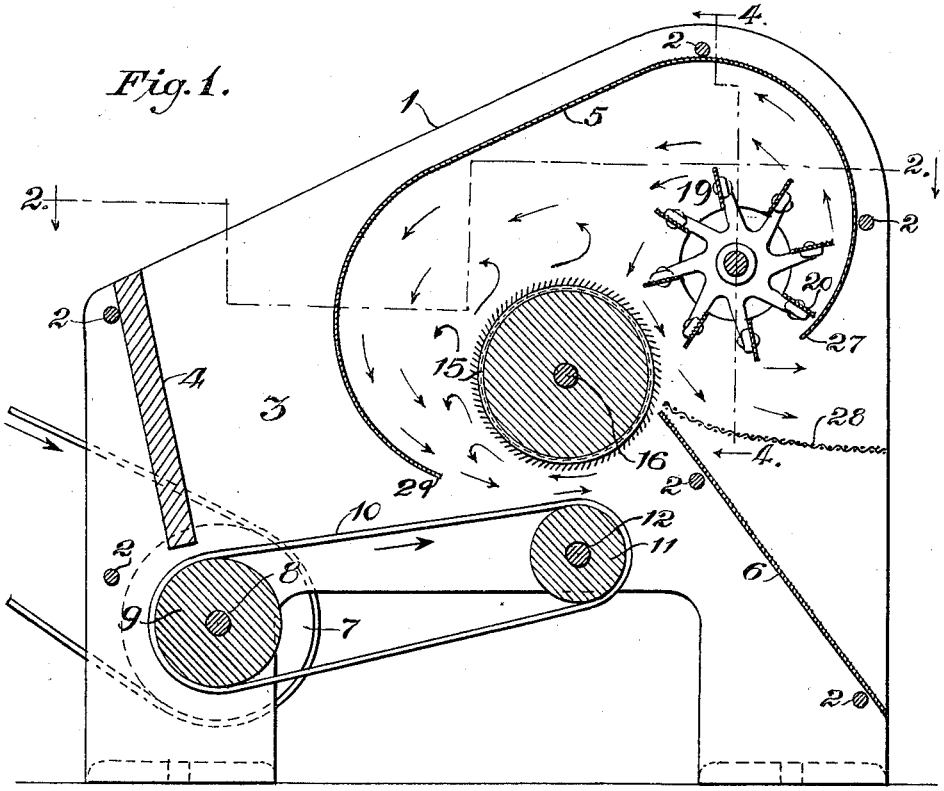
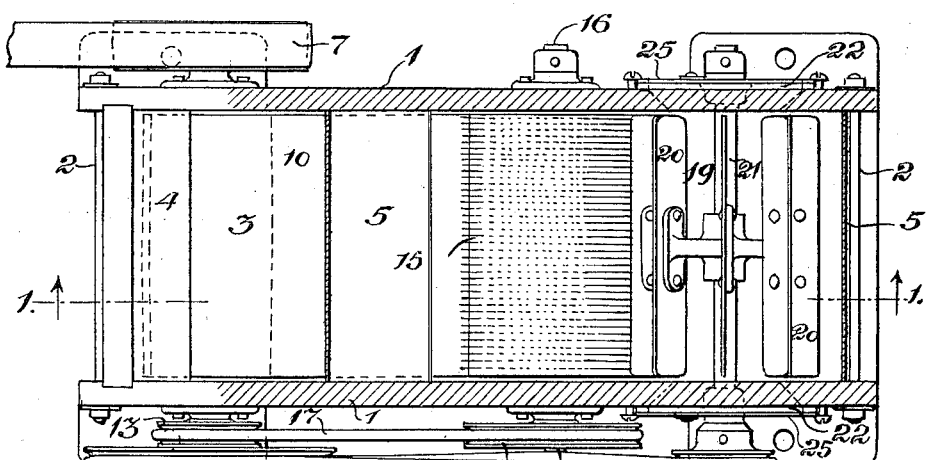
WITNESSES:
Frances E. Notes
G. Blake
INVENTOR
Bruce Clark White.
BY
Edward S. Beach
ATTORNEY B. C. WHITE.
SEED COTTON CLEANER.
APPLICATION FILED AUG. 28, 1911.
1,030,249.
Patented June 18, 1912.
2 SHEETS—SHEET 2.
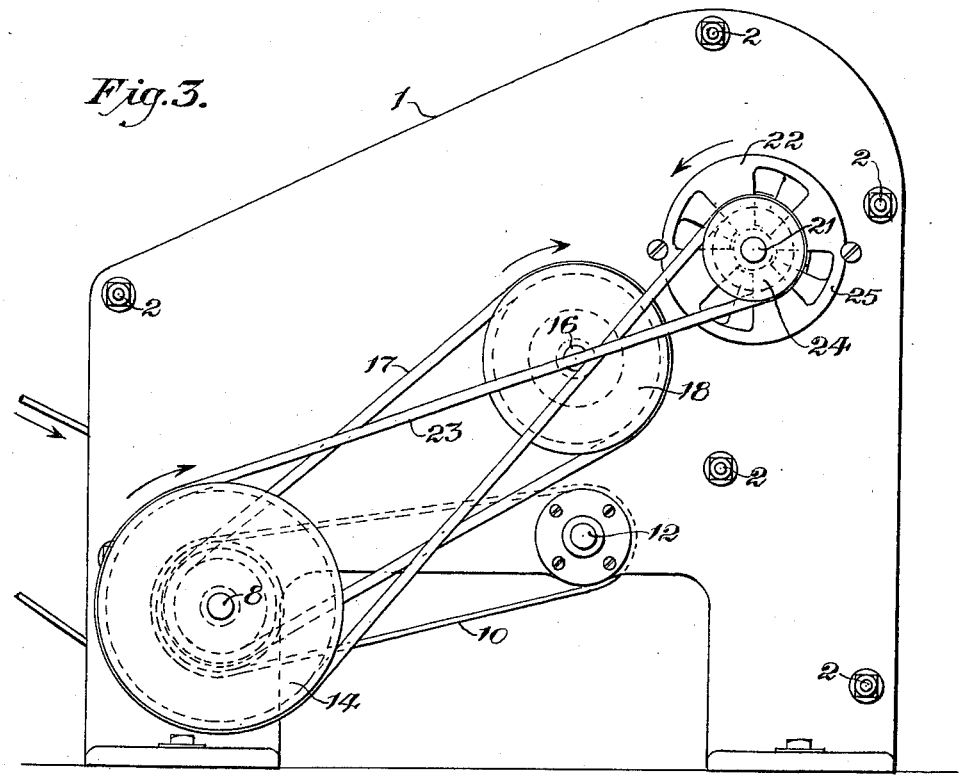
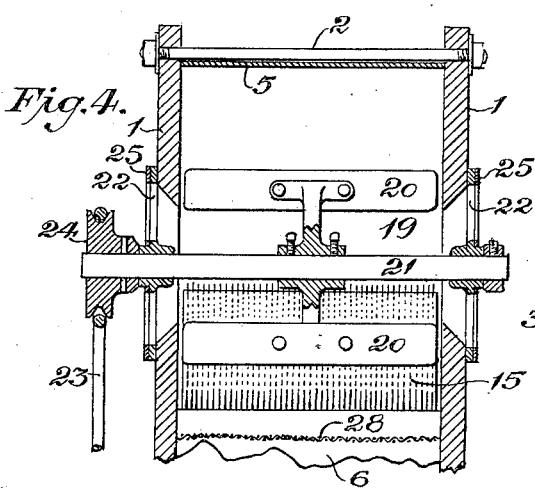
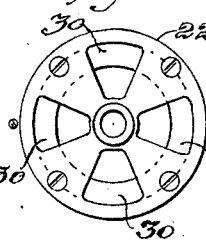
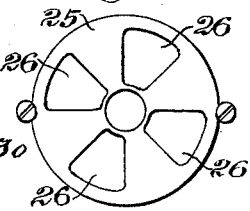
WITNESSES:
Frances E. Nares
G. Blake
INVENTOR
Bruce Clark White.
BY
Edward S. Beach
ATTORNEY

UNITED STATES PATENT OFFICE.

BRUCE CLARK WHITE, OF WOONSOCKET, RHODE ISLAND, ASSIGNOR TO PRICE-CAMPBELL COTTON PICKER CORPORATION, OF WILMINGTON, DELAWARE, A CORPORATION OF DELAWARE.

SEED-COTTON CLEANER.

1,030,249.     Specification of Letters Patent.     Patented June 18, 1912.

Application filed August 28, 1911. Serial No. 646,353.

*To all whom it may concern:*

Be it known that I, BRUCE CLARK WHITE, citizen of the United States, residing at Woonsocket, in the county of Providence and State of Rhode Island, have invented certain new and useful Improvements in Seed-Cotton Cleaners, of which the following is a specification, reference being had therein to the accompanying drawings.
My invention relates to seed cotton cleaners for separating seed cotton from trash, leaves, hulls, stems and other extraneous matter, and has particular reference to the separation of seed cotton from the green leaves which are gathered with it. It may be most advantageously used immediately after the cotton has been gathered and before it is ginned.

The object of my invention is to provide a seed cotton cleaner which shall be simple, durable and effective and which may be easily adjusted to suit the varying conditions of the cotton and of the trash mingled therewith.
In the accompanying drawings which illustrate a practical form in which my invention may be embodied, Figure 1 is a vertical section of my machine taken on line 1, 1, of Fig. 2. Fig. 2 is a plan view and partial horizontal section along line 2, 2, of Fig. 1. Fig. 3 is a side elevation. Fig. 4 is a vertical section on line 4, 4, of Fig. 1. Fig. 5 is a detail view of the fan shaft bearing or spider. Fig. 6 is a detail view of the damper for the fan spider.

Referring to the several views in which like characters of reference indicate like parts, 1, 1, are the main frames of my machine. They are tied together by the bolts 2.
Extending between them a hopper 3 is formed by the piece 4 which is clamped between the frames. Casing 5 and delivery plate 6 are likewise clamped between the frames. The whole forming a rigid structure in which the running parts are mounted.

A driving pulley 7, driven from a source of power not shown, rotates the shaft 8, journaled in the frames 1, 1. Secured to this shaft is the feed pulley 9, about which is trained the feed belt 10, which is also trained about an idler pulley 11, upon shaft 12 also journaled in the frames. Shaft 8 extends beyond the frame and has secured to it pulleys 13 and 14. A card roll 15 secured to shaft 16 likewise journaled in the main frames is driven in the direction shown by the arrows by a belt 17 trained about pulley 13 and about a pulley 18 secured to the card roll shaft 16. The card roll is preferably covered with card cloth having numerous fine, short wires projecting therefrom at an advancing angle, as shown in Fig. 1, although other well known means for providing the surface of this roll with cotton engaging projections may be used. A fan 19, provided with blades 20, is mounted upon the shaft 21, which latter is journaled in the spiders 22, 22, secured to the outside of the frames 1, 1. A belt 23 is trained about the pulley 14 and also about a fan pulley 24 secured to the fan shaft 21. The three elements, viz., feed belt, card roll and fan are arranged in the desired relation and are driven at the desired speeds and in the directions shown by the arrows in Fig. 1; the peripheral speed of the card roll being in excess of that of the feed belt but less than that of the fan.

The spiders 22, 22, are provided with openings 30, over which are fitted rotatable dampers 25, 25, having corresponding openings 26 whereby the amount of air admitted therethrough may be regulated as desired in the manner usual with such a device.

The casing 5 extends from point 27, in close proximity to the fan, upward thence rearward and downward to a point 29 between the card roll and feed belt, said casing being formed to direct the larger portion of the current of air from the fan rearward and downward around the card roll thence forward along the feed belt and finally between the feed belt and card roll as will be more fully explained.

A screen 28 receives the cotton doffed from the card roll by the fan, through which loose trash or dirt may fall while the seed cotton and lint will be blown along upon the screen to a receptacle not shown.

In operation, seed cotton with such green leaves or other extraneous matter as may be mixed therewith, is introduced into the hopper 3. The feed belt 10 carries it forward to a point beneath the card roll 15 where the cotton is engaged by the projecting wires of the card cloth covering the roll. The cotton is drawn rearward from the mass of cotton and leaves, while the leaves, not being so engaged by the card roll, will continue their forward direction upon the belt 10.

The card roll carries the cotton attached thereto around to the fan which latter revolving in the direction shown and at a speed greater than that of the card roll, disengages the cotton from it, driving it forward and downward along the screen 28. The upper edge of the delivery plate 6 is a sufficient distance from the card roll to permit the passage therethrough of cotton seed should any such fail to be removed from the card roll by the fan.

The fan is of the type used in blowers and is adapted to produce a strong air current acting tangentially from the periphery of the blades, as shown by the arrows in Fig. 1. These air currents act generally upward and rearward from the edge 27 of the casing 5 and extending around the fan periphery to a point nearest to the card roll, the arc of the circle described comprising the greater portion of the fan circumference. The lesser and remaining portion of this arc, extending from a point thereon nearest to the card roll, thence downward and forward to the edge 27, comprises that portion of the fan periphery from which the air current is directed downward and forward as shown by arrows.

The rapidly revolving fan 19 is supplied internally with air through the spiders 22, 22, controlled in quantity and force by the adjustment of dampers 25, 25. The larger portion of the air delivered by the fan passes rearward over the card roll, the rearward current opposing the forward current produced by the card roll and the cotton adhering thereto. This rearward current is greatest at the casing 5. A neutral zone is established along a curved line near the surface of the card roll, along which miniature whirlwinds occur, due to the opposed air currents.

The result of these activities is to promote the separation of loose leaves and trash from the cotton adhering to the card roll, driving the same backward and downward and finally forward upon the forward moving feed belt 10, from which it falls as the latter turns about the pulley 11. With the returning leaves and trash is a quantity of seed cotton which has not been sufficiently well engaged by the card roll to withstand the rearward air blast. This cotton is constantly driven rearward and downward until it is engaged by the card roll. The rearward blast opposed to the card roll, while detaching cotton therefrom which is not actually engaged by it, acts at the same time to retain upon its surface such cotton as is properly engaged by its forwardly pointing teeth. The fan blast is made stronger than necessary to accomplish these results. The current may be reduced as desired by closing the dampers 25.

The blast from the fan acting tangentially from the external edges of the fan blades assists in doffing the cotton from the card roll, forcing it downward and forward along the screen 28 through which dust and fine particles of trash which may have been carried along with the cotton may escape.

The relative arrangement of the elements of the device above described may be modified considerably without departing from the principle of their operation.

What I claim and desire to secure by Letters Patent is,—

In a machine for separating cotton from leaf and trash a conveyer, a cotton collecting roll, a fan doffer, a partition plate between said fan and said conveyer and a casing extending about said fan to direct a portion of the air current produced by it over and about said roll, while the remaining portion of the said air current is directed tangentially upon the surface of said roll in the direction of its rotation and away from said roll.

In testimony whereof I have affixed my signature in presence of two witnesses.

BRUCE CLARK WHITE.

Witnesses:
ANGUS CAMPBELL,
ANDREW ESKIL RYLANDER.

Copies of this patent may be obtained for five cents each, by addressing the "Commissioner of Patents, Washington, D. C."